June 6, 1944.  E. W. CARROLL  2,350,586
METHOD OF DICING FRUIT
Filed Nov. 18, 1940  2 Sheets-Sheet 1
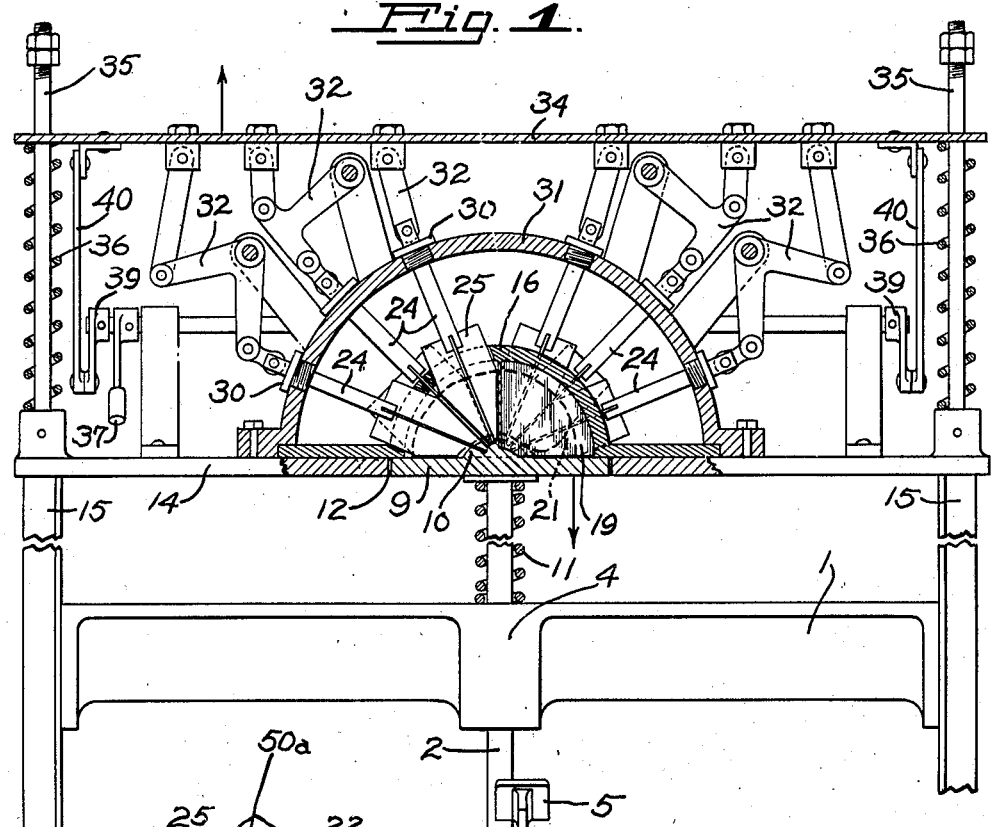
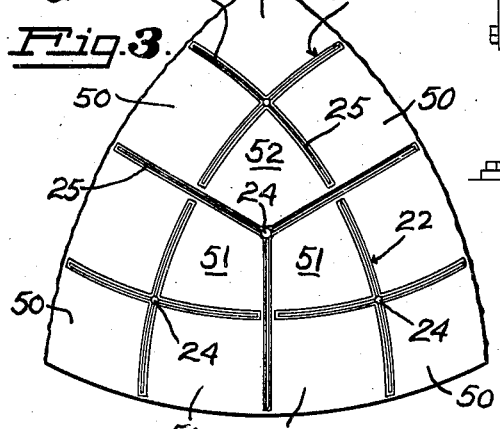
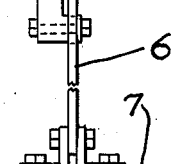
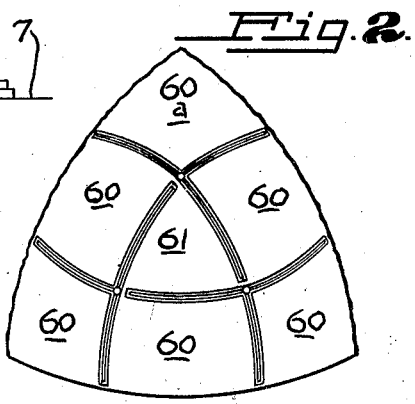
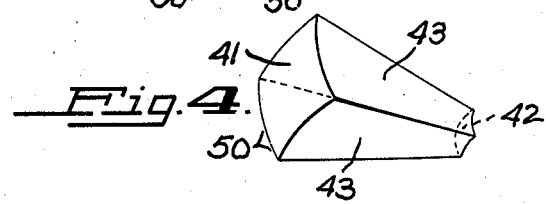
INVENTOR,
ELLSWORTH W. CARROLL.
BY Lippincott & Metcalf
ATTORNEYS.

June 6, 1944.  E. W. CARROLL  2,350,586
METHOD OF DICING FRUIT
Filed Nov. 18, 1940  2 Sheets-Sheet 2
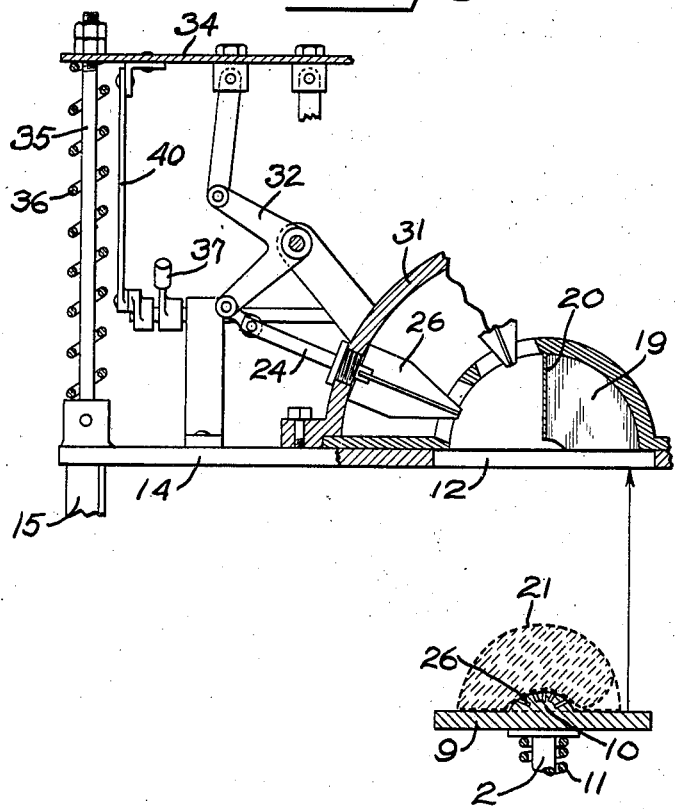
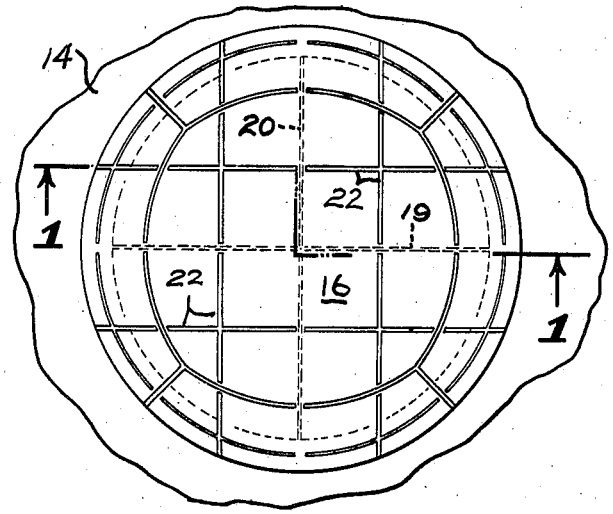
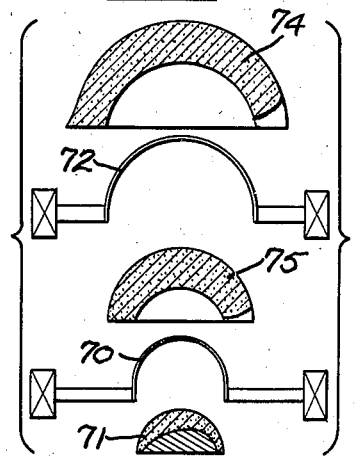
INVENTOR,
ELLSWORTH W. CARROLL.
BY
Lippincott & Metcalf
ATTORNEYS.

Patented June 6, 1944

2,350,586

UNITED STATES PATENT OFFICE 2,350,586

METHOD OF DICING FRUIT

Ellsworth W. Carroll, San Carlos, Calif., assignor to S & W Fine Foods, Inc., San Francisco, Calif., a corporation of California Application November 18, 1940, Serial No. 366,031

2 Claims. (Cl. 146—240)

My invention relates to a method of dicing fruit, and more particularly to a method where the fruit is diced substantially symmetrically.

My invention is particularly applicable in the dicing of peaches and apricots, but also may be used for dicing any fruit which may be cored and which has a generally spherical shape.

Among the objects of my invention are: To provide a simple and efficient method of dicing generally spherical fruit such as peaches, apples, etc.; to provide a method of dicing fruit into truncated pyramidal units; to provide a method of dicing fruit with a minimum amount of waste, into units of closely related weight; to provide an apparatus for dicing fruit along radial planes; to provide a product comprising fruit units of truncated pyramidal shape.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

There is a relatively large amount of fruit diced for mixing as fruit salad. Various kinds of fruit are diced and mixed together in order that the salad may be of definite composition. Heretofore, the usual custom has been to dice this fruit without regard to its shape, the dicing generally being accomplished by the use of knives cutting the fruit meat into cubes, or similar rectangularly shaped units. Inasmuch as practically all fruit used in fruit salad is generally spherical in shape, cube dicing leads to the production of a large number of fruit pieces which are of improper size, and which have to be separated from the properly cubed portion by screening, in order that a more or less uniform product be obtained. The loss of fruit meat due to this necessary separation is considerable and costly, and the present invention is directed to a means and method of dicing fruit, so that the improperly diced portion of fruit meat is negligible, in many cases so negligible that it is not necessary to make any attempt to remove it. Furthermore, due to the inevitable geometrical conflict between square dicing apparatus, and the curves found on fruit, there will be, in fruit diced on the cubical plan a large number of pieces, which, while they may have a general size relationship to the main body of fruit units, will be improperly shaped and will have combined with their rectangular surfaces, spherical surfaces which were areas of the original fruit surface. The inner meat of the fruit when diced on the cubical plan, for example, may be completely cubical. The outer meat carrying the surface of the fruit will be partly cubical and partly spherical in shape. Inasmuch as a large number of pieces will carry the fruit surface, the diced fruit will not have a uniform appearance. The present invention dices the fruit so that a maximum amount of the fruit meat is in usable condition, and produces a product wherein practically all of the units produced have the same general symmetrical appearance.

I will describe my invention as applied to the dicing of both small and large peaches and in such a manner that the diced units from both small, medium and large fruit may be combined without changing the general uniformity of the product.

In the drawings:

Fig. 1 is a vertical view partly in section and partly in elevation of a hand operated peach machine, embodying my invention.

Fig. 2 is a perspective view of one-quarter of a knife guide used for smaller peaches.

Fig. 3 is a perspective view of one-quarter of a knife guide used for larger peaches.

Fig. 4 is a diagram showing a radially cut fruit unit as produced by the machine of Figs. 1 and 2.

Fig. 5 is a view partly in section and partly in elevation of a portion of the device of Fig. 1 showing the loading position of the parts.

Fig. 6 is a top plan view of an entire knife guide used in Fig. 1.

Fig. 7 is a diagram showing the separation of the meat of large peach halves into concentric shells.

My invention may be more fully understood by direct reference to the drawings:

A frame bar 1 is provided through which a vertical shaft 2 is passed, this shaft being slidable in frame bearing 4. The lower end of rod 2 is connected to a foot pedal 5 so that pressure on foot pedal 5, forming a portion of lever 6 attached at one end of floor 7 will move rod 2 downwardly. Attached to the upper end of rod 2 is a fruit receiving platform 9 having a fruit positioning boss 10 on the upper surface thereof, this boss being roughly hemispherical in shape to fit the pit or core removal cavity of a halved fruit. In the case of peaches boss 10 is shaped to fit the cavity remaining after a halved peach has been pitted, as will be explained later. Platform 9 is maintained in its upper position by a platform spring 11 surrounding rod 2, between frame 1 and platform 9. Thus, when foot pressure is released from pedal 5, platform 10 will rise to its upper position, under the influence of spring 11. In this upper position platform 9 registers with an aperture 12 in a horizontal plate 14, this plate being supported from frame bar 1 by lateral angle irons 15. Immediately over aperture 12 is mounted a knife guide 16, forming a cover over platform 9. Knife guide 16 is preferably hemispherical in shape and of sufficient inside diameter to accommodate peach halves of predetermined maximum size, without crowding. Knife guide 16 is also provided with inner knives 19 and 20 crossing at 90°, and extending inwardly toward boss 10 to bottom in slots cut in said boss when platform 9 is in its upper position. The lower edges of knives 19 and 20 are preferably sharpened so that when a peach half as represented by the dotted line 21 in Figs. 1 and 5, is on the platform and the platform raised into the upper position, the peach half will be quartered.

In Fig. 3, I have shown one-quarter of the spherical area of the knife guide 16 in perspective. Knife slots 22 are cut through knife guide 16 using a twelve-unit pattern. A plurality of knife assemblies are provided, each assembly being mounted on a radially extending stem 24, and each knife assembly comprises a plurality of radially extending blades 25. These blades extend through the slots in the knife guide 16 and are directed toward boss 10. The blades are angularly tapered so that when all of the blades bottom in slots 26 in boss 10, their edges will meet, and separate the fruit into units. The knives are radially moved into and out of the fruit by mounting stems 24 in bearings 30 in a hemispherical stem guide 31 concentrically positioned over knife guide 16. Each stem is moved, through the medium of a link 32 attached to link plate 34 mounted for vertical movement on rods 35 extending upwardly from plate 14. Link plate 34 is maintained in its upper position, with the knives withdrawn, by plate springs 36, and is moved to its lower position with the knives projected into the fruit by hand lever 37, connected by cranks 39 and rods 40 to plate 34.

Thus the mechanism I have described permits the mounting of half a pitted peach on boss 10 while platform 9 is in its lowest position, with means for returning the platform to its uppermost position, thereby causing the fruit half to become quartered by crossed knives 19 and 20. After platform 9 with the fruit thereon has been quartered, blades 25 may then be forced radially and simultaneously into the fruit by movement of plate 34 to dice each quarter into segments or units such as shown in Fig. 4. These units will be of truncated pyramidal shape, with an outer spherical surface 41 from the outside surface of the peach, and an inner and smaller spherical surface 42 from the pit cavity surface, with radially cut plane surfaces 43 on the sides of the unit. Surfaces 41 and 42 will be roughly concentric.

In the case of the blade pattern shown in Fig. 3, all of the fruit units produced will have a quadrangular cross-section. This pattern is for a medium sized or large peach. Four blade assemblies are used, and each boundary of the quarter is divided by blade edges into fourths. The central knife assembly carries only three blades whereas the outside blade assemblies carry four blades. One blade of each lateral knife assembly preferably bisects the extent of each central blade. The numerals used will refer to the units cut by the blade patterns used on the knife guide 16. Thus, the units 50 produced around the boundaries of the quarter are all substantially identical in size, shape and weight. The two lower inner units 51 will only be very slightly under the weight of the outer units, and the upper central unit 52, while still quadrangular in section will be of lower weight. The size and weight discrepancy, however, is small, and the number of units 52 per peach is only eight.

It will be noticed that each peach half carries at one end thereof, half of the stem indent of the fruit. Consequently, one top unit 50a will be missing in each quarter. I have therefore designed the size of unit 50a with relation to the stem indent volume included in each quarter, so that the adjacent units are not greatly affected by the cut including the stem indent area. In fact I find that it is advisable to so adjust the blade spacing so that there may be a slight cut into the two units 50 adjacent unit 50a in order that these pieces may be properly shaped. The small amount of meat cut from around the stem indent may be disregarded in the final product.

Inasmuch as two units corresponding to the stem indent are lost for each half, the pattern of Fig. 3 will produce 92 truncated symmetrical units per peach, all of the same order of weight, with 68 having a substantially square cross-section (units 50) and 24 having a modified quadrangular cross-section (units 51 and 52). However, as above pointed out, the difference in weight and size between pieces 50—51, and pieces 52 is not sufficient to be noticed in the final product.

The pattern illustrated in Fig. 2 is for a smaller peach. In this case the three sides of the quarter are trisected by the blades and three blades are used on each blade assembly. With this design 52, truncated pyramidal units 60 are produced, 44 having a substantially square cross-section and of uniform weight, and 8 of lower weight and having a triangular section, the latter comprising center units 61. In this case the units 61 compare very favorably in size and weight with units 52 cut by the pattern of Fig. 3, and the weight of lateral units 60 is very close to the weight of lateral units 50 in the design of Fig. 3, although the units from the larger peach will be somewhat longer radially.

Thus it can be seen that by using the pattern of Fig. 2 on the smaller peaches and the pattern of Fig. 3 on the medium sized and larger peaches, that the units produced from each cutting pattern may be readily mixed together, and after they are once mixed, the uniformity of the product is such that units from the two size pieces cannot be grossly distinguished, as the presence of the smallest units 52 and 61 can only be seen by close inspection. In practice paches may be separated into three grades, generally large generally medium and generally small, and the medium and small peaches diced separately in machines built in accordance with Fig. 1, one of them having a blade pattern of Fig. 3, and the other the pattern of Fig. 2.

One reason for the symmetry of the radially cut fruit units is that many modern peach pitting machines saw the peach and pit in half along the seam plane and by means of a rotary knife 70 as shown diagrammatically in Fig. 7, cut out a hemispherical inner portion 71 of the peach which includes the pit half. Thus the pit cavity becomes uniformly hemispherical in all the peaches so pitted.

Large peaches may be handled in a slightly different manner. At the time of pitting with the rotary knife 70 previously described, another rotary knife 72 rotating concentrically with the pitting knife may be used to separate the meat of each half into two concentric shells 74 and 75 as shown diagrammatically in Fig. 7, and each shell may be of substantially the same radial thickness. The shells may then be separated and the larger shell 74 diced in a machine having a blade pattern of Fig. 3, with however, a central boss made slightly larger to fit the cavity left by the removal of the inner shell. The inner shell 75 may then be diced by a machine using the blade pattern of Fig. 2. This will produce 52 units from the inner shell and 92 units from the outer shells, thus making a total of 144 units per large peach. A large peach, say of 3½ inch diameter will weigh about 2.75 times as much as one of 2½ inch diameter which compares very favorably with the ratio of 2.775—1 for the number of segments (144) cut from both shells of the large peach, and the number of segments (52) cut from a smaller peach. The peaches may therefore be divided into three general groups, large, medium and small, radially and symmetrically diced, and the units mixed together to form a substantial uniform product.

The fruit units from each machine when mixed together give a mass product which has an extremely uniform character, far more uniform in appearance than a screened product made by square dicing. The meat loss with the radial type of cutting herein described is very low. The product to the eye is uniformly shaped, as all of the units are quadrangular in cross-section with the exception of the small percentage of units 61, which is very small when mixed with fruit units produced by the cutting pattern of Fig. 3.

I claim:

1. The method of dicing stoned substantially spherical shaped fruit with a minimum amount of waste into units of closely related weight, and whereby all of said units can be used without any further screening operation to provide a uniformly diced product, which comprises providing stoned halved fruit, cutting the stoned halved fruit into substantially equal sections and simultaneously making in said sections a plurality of radially directed planar cuts only, which intersect with each other on a plurality of lines within the fruit, the lines of intersection of any two different planes forming a substantial angle with each other, said cuts intersecting to produce a plurality of truncated pyramidal units.

2. The method of dicing stoned substantially spherical shaped fruit which comprises, providing stoned halved fruit, cutting the stoned halved fruit into substantially equal sections and simultaneously making in said sections a plurality of radially directed intersecting planar cuts only, which intersect with each other on a plurality of intersecting lines within the fruit, said cuts intersecting to produce a plurality of truncated pyramidal units.

ELLSWORTH W. CARROLL.